(12) United States Patent
Choi-Grogan

(10) Patent No.: US 8,126,491 B1
(45) Date of Patent: Feb. 28, 2012

(54) AUTOMATIC REDIAL AFTER CALL ESTABLISHMENT FAILURE

(75) Inventor: Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 914 days.

(21) Appl. No.: 11/624,715

(22) Filed: Jan. 19, 2007

(51) Int. Cl.
*H04B 7/00* (2006.01)
*H04W 72/00* (2009.01)
*H04W 24/00* (2009.01)

(52) U.S. Cl. ............... 455/510; 455/450; 455/423
(58) Field of Classification Search ........... 455/510, 455/412.1, 435.1, 450, 423
See application file for complete search history.

(56) References Cited

U.S. PATENT DOCUMENTS

| | | | |
|---|---|---|---|
| 2003/0119520 A1* | 6/2003 | Yoshioka et al. | 455/456 |
| 2005/0147052 A1* | 7/2005 | Wu | 370/252 |
| 2005/0202849 A1* | 9/2005 | Ignatin | 455/564 |
| 2006/0294367 A1* | 12/2006 | Yoshioka | 713/156 |
| 2007/0190980 A1* | 8/2007 | Britt et al. | 455/414.1 |

* cited by examiner

*Primary Examiner* — Christopher M Brandt
(74) *Attorney, Agent, or Firm* — Moazzam & Associates, LLC

(57) ABSTRACT

A mobile station re-tries initiating a call after a previous failure of a call to that number due to poor air interface signal communication. When the mobile station detects such a call failure, it records in memory an indication of the call failure and the number that was called. Once the mobile station has found and registered with a base station with which it is determined that good signal communication can be established, the presence of a call failure indication in memory causes the processing logic to direct the mobile station to re-try the failed call.

10 Claims, 3 Drawing Sheets

| | |
|---|---|
| 555-555-0123 | 1 |
| 555-555-4567 | 1 |
| 555-555-8901 | 0 |
| 555-555-8901 | 1 |

| | |
|---|---|
| 555-555-2345 | 1 |

FIG. 4

AUTOMATIC REDIAL AFTER CALL ESTABLISHMENT FAILURE

BACKGROUND OF THE INVENTION

1. Field of the Invention

The present invention relates generally to wireless mobile telecommunication networks and, more specifically, to establishing a new mobile-originated call after a previous failure to establish a call.

2. Description of the Related Art

In wireless mobile, i.e., cellular, telecommunications, there are times when a mobile station attempts to make a call in an area of poor coverage but the call fails to be established. The term "coverage" refers to continuity in quality and strength of the air interface (radio) signals across a geographic area. In an area of "good coverage," the signals communicated between a mobile station and a base station are generally sufficient in quality, strength or other relevant parameters to enable calls to be made and received at the mobile station throughout the area. In an area of little or no coverage, the signals communicated between a mobile station and a base station, if any can be received at all, are of too poor a quality or otherwise not sufficiently "good" to enable calls to be made and received at the mobile station. In still other areas there may be poor or spotty coverage. Such areas are most often at the boundaries between adjacent cells or otherwise at edges of good coverage areas but also occur where buildings or natural features prevent good signal propagation. Sometimes, as a mobile station moves from one location to another, coverage improves or worsens. If a mobile station user dials a number but the call fails, the user will typically redial and try again. The call often can be established on such a second try, especially if the user is moving into an area of better coverage.

When a mobile station user attempts to make a call, but the air interface signal communication is too poor for the network to establish the call, i.e., the call fails, the mobile station may search for a base station with which signal communication is good. (Although the generic term "base station" is used herein for purposes of clarity, the equipment is commonly referred as a "Base Transceiver Station"/"Base Station Controller" in the lexicon of networks conforming to the Global System for Mobile telecommunications (GSM) standard, a "Node-B"/"Radio Network Controller" in the lexicon of networks confirming to the Universal Mobile Telecommunications System (UMTS) standard, or by other names in other types of networks.) If the mobile station finds such a base station, the base station may be one other than that which was previously involved in the failed call, even if the user has not moved, as the coverage areas of adjacent base stations generally overlap to some extent. Thus, if a user immediately redials the number after a failed call, the call may be successfully established on the second attempt if the mobile station has found a better base station with which to communicate. When a mobile station initially establishes communication with a base station, a process known as registration occurs, whereby the mobile station makes its presence and ability to communicate through that selected base station known to the network. The network element that maintains such registration information is known as the Home Location Register (HLR). If such a mobile station is roaming, similar information noting the location of the visiting mobile station and its ability to communicate through a selected base station is recorded in a Visitor Location Register (VLR), which is in many instances combined with the HLR as a single unit of network equipment.

It is known for some mobile stations to automatically (i.e., without user input) redial or re-try a call to the same number following call failure. Such mobile stations do not necessarily perform any actions other than redialing in response to a call failure.

As discussed above, areas of poor coverage commonly occur at the edges of network coverage. Service providers adding newer third-generation (3G) network equipment to supplement (and eventually supplant) existing second-generation (2G) equipment in the same coverage areas can give rise to new coverage edges. Until a service provider has completely substituted 3G network equipment (e.g., Universal Mobile Telecommunications System or UMTS), for its existing 2G network equipment (e.g., GSM), a service provider's 2G network portions will continue to provide greater coverage than its UMTS or other 3G network portions, thereby creating difficulties for users. For example, a dual-mode mobile station at the edge of an area having UMTS service may fail to establish a call in UTMS mode, but may be able to establish a call in (2G) GSM mode. Accordingly, in response to the call failure, the mobile station may search for a better base station with which to communicate, and it may find and register with a base station of the GSM network portion rather than the UMTS network portion due to the greater coverage of the GSM network portions. However, the user cannot obtain the benefit of the mobile station having found and registered with a better base station (whether of the 3G or 2G network portion) unless the user redials and tries again. A user generally must press a "Talk" or similar button on the keypad to redial. The user has no way of knowing whether the mobile station has registered with a better base station unless the user tries to make another call. Thus, a user will often press the button to redial after a call failure in hope that re-trying the call will result in call establishment. If the mobile station has found and registered with a better base station at that time, the redial may result in call establishment. If the mobile station has not found such a base station, the redial may result in yet another call failure. A user may repeatedly redial in this manner if multiple attempts fail to establish the call. Having to redial after a call failure can be especially perplexing and thus annoying to users operating in areas that they have come to believe are well covered by their service provider's network but which, in reality, are only well covered by the 2G portions of their service provider's network.

It would be desirable to relieve a user from having to initiate or re-initiate a call to determine whether a call is likely to be more successful than a previous call. It is to such a method and system that the present invention is primarily directed.

SUMMARY OF THE INVENTION

The present invention relates to a system and method for re-trying a mobile station-initiated call after a previous failure of a call to that number or other destination due to poor air interface signal communication. In an exemplary embodiment of the invention, the digital processing logic of the mobile station is programmed or configured to, in addition to conventional tasks relating to operation of the mobile station: detect a call failure, record in memory an indication of the call failure and the number that was called, seek and register with a base station with which good signal communication can be established and, if there is a call failure indication stored in memory and it is determined that there is a base station through which a call can be established, direct the mobile station to re-try the failed call.

It should be noted that determining whether the mobile station is able to communicate or establish a call through the selected base station refers not to a certainty but rather to a likelihood or estimation that the signal or signals communicated between the base station and the mobile station are sufficient in strength, quality or other parameters to support a call.

The processing logic can clear the call failure indication from memory after the call is re-tried. If the call fails again, the process can be repeated.

It should also be noted that although in the exemplary embodiment of the invention, described in further detail below, the illustrated network is of the GSM type, the invention can be embodied in any other suitable wireless mobile telecommunications network technology.

BRIEF DESCRIPTION OF THE DRAWINGS

FIG. 4 illustrates an outgoing call table stored in a mobile station memory, in accordance with the exemplary embodiment.

DETAILED DESCRIPTION

Figure 1:
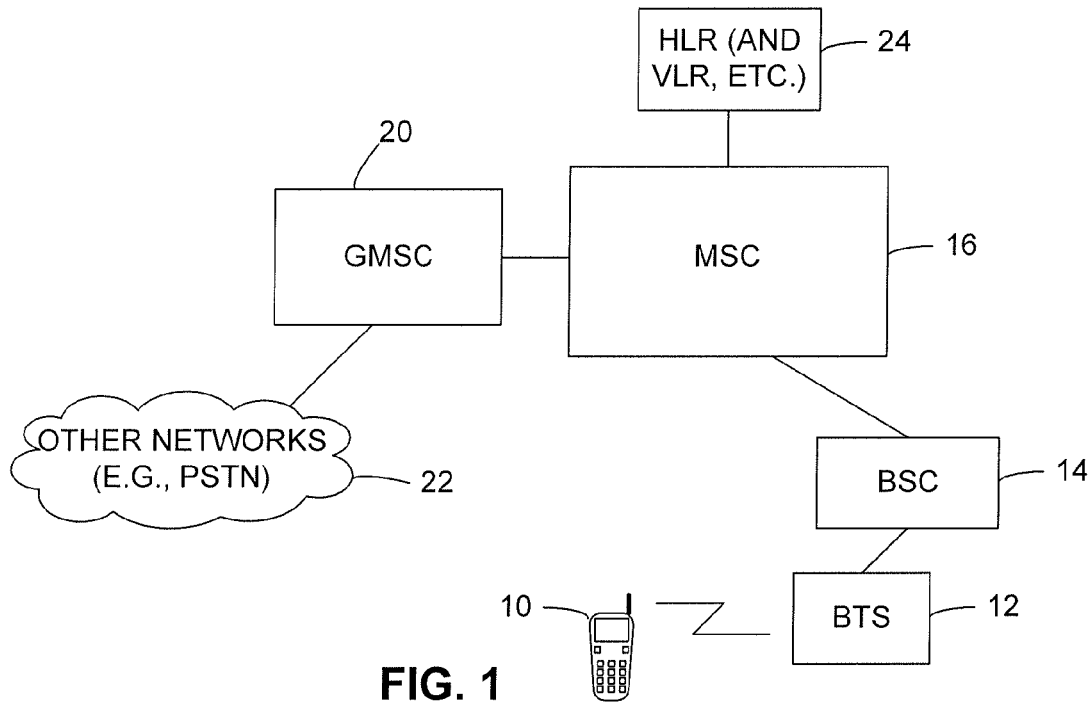
FIG. 1 is a block diagram of a wireless mobile telecommunications network in accordance with an exemplary embodiment of the present invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

As illustrated in FIG. 1, a Mobile Station (MS) 10 can communicate with a wireless telecommunications network. In this exemplary embodiment of the invention, the network is of the GSM type, but in other embodiments the network and associated mobile station can be of any other suitable type. In the exemplary embodiment, the network itself can be conventional, and the system and method of the invention are embodied in MS 10. Nevertheless, in other embodiments, elements of the network can also perform some operations relating to the invention.

In accordance with the GSM standard, as well understood in the art, the network includes a number of Base Transceiver Stations (BTS) 12 that are, in turn, controlled by one or more Base Station Controllers (BSC) 14. In more general terms that apply to not only GSM but also various other standards, the equipment that communicates with the mobile station can be referred to as a base station. The area covered by a base station is commonly referred to as a cell. The manner and means by which radio signals are communicated (i.e., transmitted or received) between mobile station 10 and a base station can be referred to as the air interface. The air interface, as well as other aspects relating to how calls are made and received, are well understood in the art and therefore not described herein for purposes of clarity. Note that although a GSM-type network is shown for purposes of illustration and clarity, the invention can be embodied in any network type, including those of any suitable second-generation (2G), third-generation (3G) or other network type.

BSC 14 and any other associated Base Station Controllers (not shown), in turn, communicate with a Mobile Switching Center (MSC) 16 that provides the logic and switching circuitry for directing calls to and from mobile stations as well as logic for mobility management (i.e., handover of mobile stations from one cell to another) within the network area that MSC 16 serves. A Gateway MSC (GMSC) 20 determines which of perhaps several Mobile Switching Centers is currently handling the mobile station being called. GMSC 20 also interfaces with other networks 22, such as the Public Switched Telephone Network (PSTN). Calls can be made to and from MS 10 in the conventional manner as MS 10 moves about the area covered by the network (and any other networks on which MS 10 may be permitted to roam).

The network further includes a conventional Home Location Register (HLR) 24, which can include as part of the same equipment unit a Visitor Location Register (VLR) as well as other elements, as known in the art. As MS 10 moves about the network, MSC 16 updates data recorded in HLR 24 in the conventional manner to note the cell or base station with which MS 10 has registered.

Figure 2:
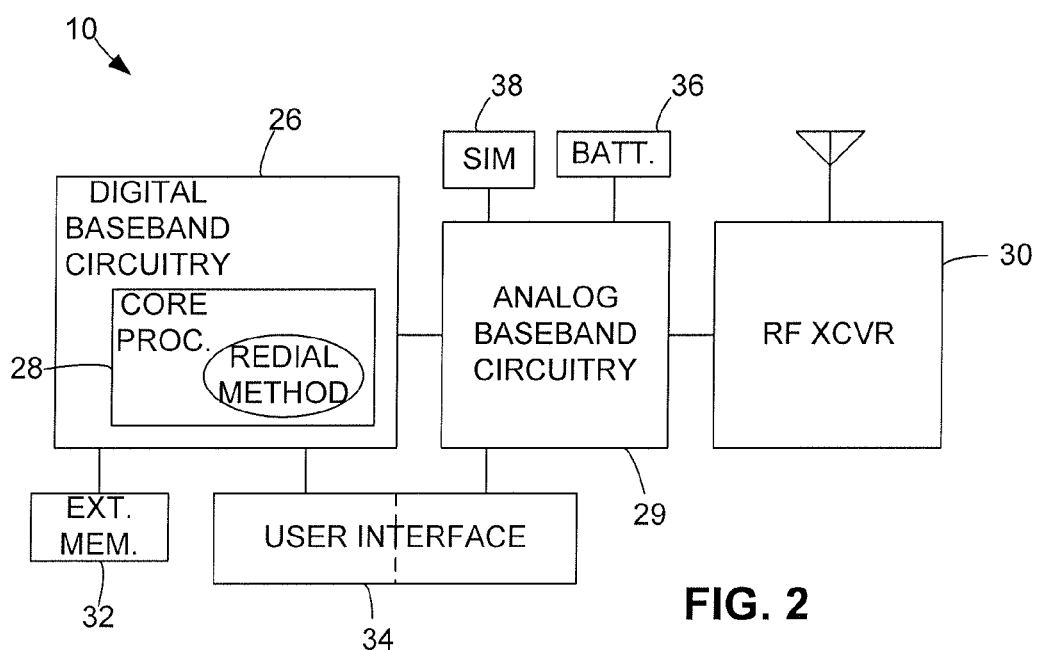
FIG. 2 is a block diagram of a mobile station in accordance with the exemplary embodiment.

As illustrated in FIG. 2, MS 10 includes digital baseband circuitry 26 having core processing logic 28 that is programmed or configured to perform the exemplary method described below in addition to conventional methods relating to the making and receiving of calls and other conventional operations of the types commonly performed in mobile stations. In addition to digital baseband circuitry 26 that performs essentially all of the digital operations needed to operate MS 10, MS 10 includes analog baseband circuitry 29 that performs essentially all of the analog operations, and radio frequency (RF) transceiver circuitry 30 that defines the mobile station side of the air interface. Digital baseband circuitry 26 is coupled to external memory 32 and digital portions of the user interface 34, such the display screen, keypad, and other such digital user interface elements commonly included in conventional cellular telephones and other types of mobile stations. Analog baseband circuitry 29 is coupled to the battery 36, SIM card 38, and analog portions of user interface 34, such as the microphone, speaker, vibrator (buzzer), LED indicator lamp, and other such analog user interface elements. MS 10 can include additional elements of the types commonly included in conventional cellular telephones and other types of mobile stations, but such elements are not shown for purposes of clarity. Note that the above-described architecture of MS 10 is intended only to be exemplary, and persons skilled in the art will readily be capable of embodying the invention in systems and methods relating to any other suitable type of mobile station.

In the exemplary embodiment, the aspect of MS 10 that relates most directly to the present invention is the programmed or configured core processing logic 28. Processing logic 28 can comprise, for example, a programmed processor or controller or other hardware, software, firmware or combination thereof. In addition to processing logic 28, digital baseband circuitry 26 includes internal memory (not separately shown), digital signal processing circuitry (not separately shown) that performs GSM encoding and decoding and other functions, and other elements of the types commonly included in the digital portions of a mobile station. In addition to effecting the methods of the present invention, MS 10 operates to make and receive calls in the conventional manner.

Figure 3:
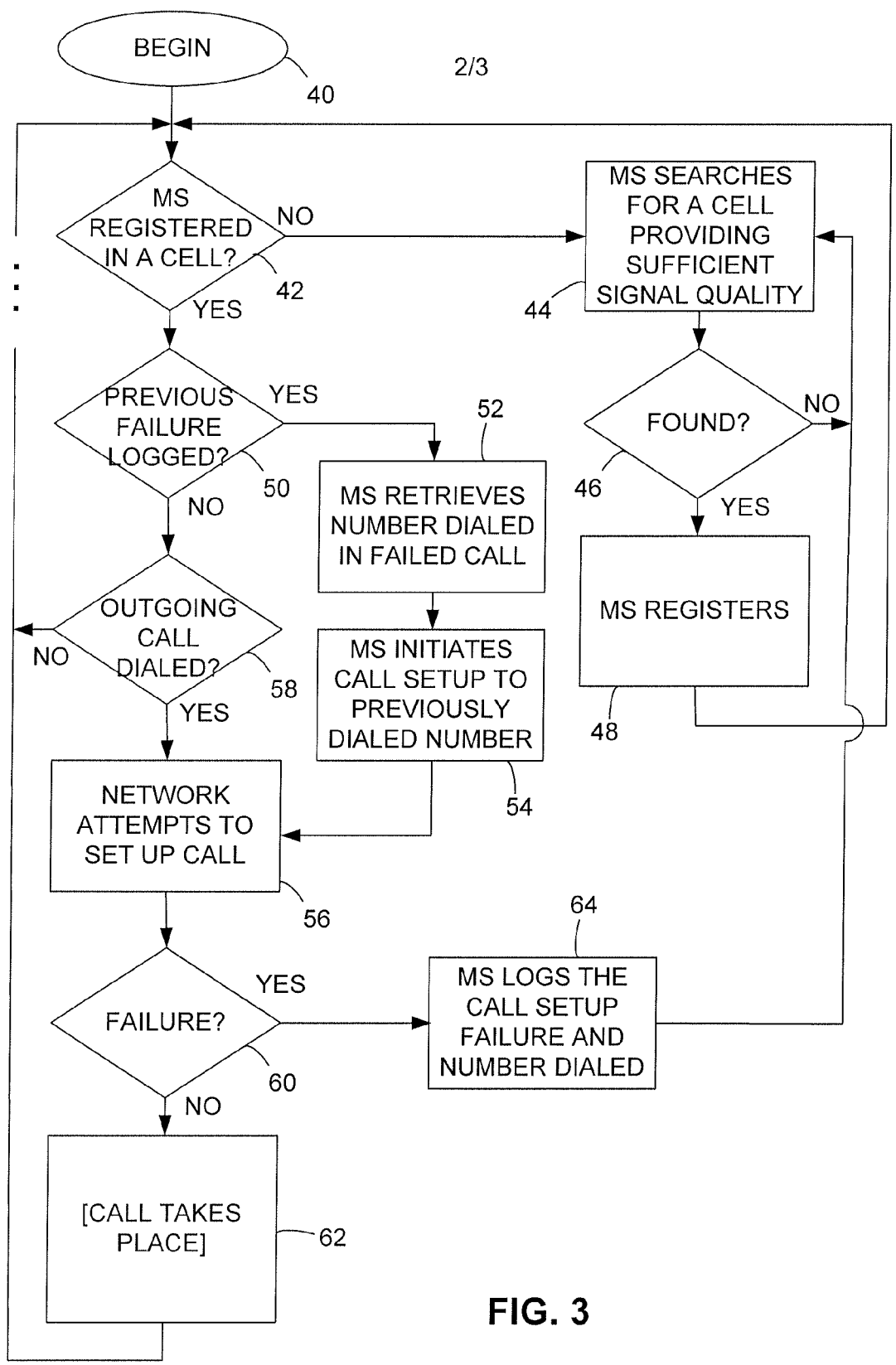
FIG. 3 is a flow diagram illustrating a method for redialing a mobile-initiated call after a previous call failure.

The flow diagram of FIG. 3. illustrates the exemplary method. The method begins at step 40 when MS 10 is powered up or at any other suitable time. For purposes of clarity, the flow diagram is directed only to operations that directly relate to the present invention and does not reflect other operations that occur, such as the initiation of an outgoing call by the user (by dialing a number, etc.), the receipt of an incoming call, storing and retrieving numbers using an address directory, or any of the various other operations commonly performed in conventional mobile stations that can also be performed in MS 10. The ellipsis (" . . . ") in the flow diagram is intended to illustrate where such conventional operations can occur, but they can also occur at any other suitable points in relation to the steps of the exemplary method.

At step 42, it is determined in the conventional manner whether MS 10 is to register with the network, such as by MS 10 examining control channel signals it receives from base stations. Step 42 is a conventional step that occurs in mobile stations upon powering up or at other times. If MS 10 is not registered (or if some other condition indicates that MS 10 is to re-register), then at step 44 it searches for a cell, i.e., a base station, in the conventional manner. As in some conventional network systems, MSC 16 can be involved in the decision as to with which of several candidate base stations MS 10 should register. As known in the art, the decision is generally based upon air interface signal quality, strength or other aspects of the signals transmitted to or received from MS 10. Alternatively, MS 10 can register with the base station from which it receives the strongest control channel signal. When such a base station is identified, as indicated by step 46, MS 10 registers at step 48 in the conventional manner. Details of the registration process are well understood in the art and therefore not shown for purposes of clarity.

If MS 10 is registered with a cell, then at step 50 MS 10 (through processing logic 28) determines whether it has logged a previous call failure. Processing logic 28 can determine this by examining a portion of memory that includes, for each outgoing call, an indication of the number that was dialed and an indication of whether the call was established or failed, as shown in FIG. 4. The memory portion can be a portion of external memory 32 (FIG. 2) or other memory. Other portions of the same memory can be used for conventional purposes, such as for storing an address book. Although the memory portion shown in FIG. 4 is organized as a table of outgoing calls with corresponding indications ("1" indicating successful establishment of a call, and "0" indicating a failure to establish a call), in other embodiments such a memory portion can be organized in any other suitable way. The organization scheme shown in FIG. 4 is intended to be exemplary only, and others will occur readily to persons skilled in the art. For example, there can be a single table listing numbers associated with all incoming and all outgoing calls along with corresponding indications of whether a call was incoming or outgoing. Alternatively, there can be a separate table listing only those numbers associated with failed calls. Also, although the memory portion is conceptually shown in FIG. 4 as though it were contiguous and table-like for purposes of illustration, persons skilled in the art will appreciate that memory can be addressed, and the addressed memory locations used, to define a table in any suitable manner.

If it is determined at step 50 that the previously dialed outgoing call failed, then at step 52 processing logic 28 retrieves the number associated with the failed call, and at step 54 processing logic 28 initiates a call setup to that number, i.e., it effectively redials the number. Step 56 indicates that, in response, the network attempts to establish the call (through the base station with which MS 10 is then registered). Returning momentarily to step 50, if it is determined that the previously dialed outgoing call did not fail, i.e., it was successfully established, then at step 58 processing logic 28 considers whether the user has dialed a number to call.

If the network attempts to set up a call at step 56, either as a result of processing logic 28 having initiated a call setup at step 54 to a previously dialed number or as a result of the user having dialed a new number as indicated by step 58, then at step 60 processing logic 28 determines whether the call failed to be established due to poor air interface signal conditions. If it is determined that the call has been successfully established, then the call proceeds in the conventional manner, as indicated by step 62. However, if it is determined that the call failed, then at step 64 processing logic 28 logs the call failure. That is, in addition to recording the number dialed in the outgoing call table, as a mobile station would conventionally do in the case of any ordinary outgoing call, processing logic 28 also records a corresponding indication (e.g., "0") that indicates the call failed. In embodiments of the invention in which the memory portion is organized as a separate table that lists only those numbers associated with failed calls, processing logic 28 would record the number in that table, and the recordation of the number would itself serve as the corresponding indication that the call failed. As such an embodiment illustrates, the indication need not be a bit such as "1" or "0" or other separate value but rather can be the presence of the number itself or any other condition that processing logic 28 can recognize.

If the call failed, then the method continues at step 44 or a similar step at which MS 10 seeks a base station through which it is determined that a call can be communicated. That is, a base station is found through which air interface signals sufficient in strength, quality or other aspects to handle a call can be communicated with MS 10. The determination can be made in the same manner as that in which determinations of whether to register a mobile station with a selected base station are made. Alternatively, MS 10 can make the determination based upon measurements of the strength, quality or other aspects of signals received from selected base stations. Note that MS 10 is not limited to finding a new cell in the same network technology (e.g., GSM in the illustrated embodiment of the invention) but should be able to search for better cells in other technologies. For example, a mobile station registered in a GSM cell may find a UMTS cell that is better than its current GSM cell, and a mobile station registered in a UMTS cell may find a GSM cell that is better than its current UMTS cell.

Although not shown for purposes of clarity, once a redialed call has been successfully established, processing logic 28 can change the indication in memory accordingly.

As described above, MS 10 not only finds a better cell with which to register in the event that a call fails due to poor air interface signal communication but also then redials the number associated with the failed call without the user having to press a "Talk" button or other button to redial and without the user having to be concerned whether a better cell with which to communicate has been found. Rather, as soon as MS 10 has found a better cell (or the signal communication with the previously used cell is determined to have improved sufficiently), it re-tries the call. Hence, the automatic redial method of the present invention masks call setup failures from users. That a call was redialed and ultimately successful is transparent to the user and therefore improves the user experience and perception of good network coverage.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for improving the user perception of good network coverage during a mobile station-initiated call in a mobile wireless telecommunications system, the method comprising:
    detecting a failure to establish a mobile station-initiated call to a destination;
    recording an indication of the destination and a corresponding call failure indication in response to detection of failure to establish the mobile station-initiated call;
    determining whether a call can be communicated through a selected base station; and
    re-trying to establish the mobile station-initiated call to the destination in response to a determination that a call can be communicated through the selected base station;
    wherein the detecting, recording, determining, and re-trying are masked from the user;
    wherein the failure to establish the mobile station-initiated call is masked from the user.

2. The method claimed in claim 1, wherein the step of determining whether a call can be communicated through a selected base station comprises the mobile station seeking, in response to detecting failure to establish the call to the destination, a base station through which it is determined that a call can be communicated.

3. The method claimed in claim 2, wherein the step of determining whether a call can be communicated through a selected base station comprises the mobile station participating in a registration process through the selected base station.

4. The method claimed in claim 1, wherein the step of determining whether a call can be communicated through a selected base station comprises measuring signal quality.

5. The method claimed in claim 1, wherein the step of recording an indication of the destination and a corresponding call failure indication comprises recording in a mobile station memory portion representing an outgoing call log.

6. A system in a wireless telecommunications system mobile station for improving the user perception of good network coverage during a mobile station-initiated call, the system comprising:
    a memory portion for recording indications of occurrences of calls; and
    processing logic programmed or configured to:
        detect a failure to establish a mobile station-initiated call to a destination;
        record in the memory portion an indication of the destination and a corresponding call failure indication in response to detection of failure to establish the mobile station-initiated call;
        determine whether a call can be communicated through a selected base station; and
        direct the mobile station to re-try establishing the mobile station-initiated call to the destination in response to a determination that a call can be communicated through the selected base station;
    wherein the operations of the processing logic are masked from the user;
    wherein the failure to establish the mobile station-initiated call is masked from the user.

7. The system claimed in claim 6, wherein the processing logic directs the mobile station to seek, in response to detecting failure to establish the call to the destination, a base station through which it is determined that a call can be communicated.

8. A system in a wireless telecommunications system mobile station for improving the user perception of good network coverage during a mobile station-initiated call, the system comprising:
    means for detecting a failure to establish a mobile station-initiated call to a destination;
    means for recording an indication of the destination and a corresponding call failure indication in response to detection of failure to establish the mobile station-initiated call;
    means for determining whether a call can be communicated through a selected base station;
    means for re-trying to establish the mobile station-initiated call to the destination in response to a determination that a call can be communicated through the selected base station; and
    means for masking the operations of the means for detecting, means for recoding, means for determining, and means for re-trying from the user;
    wherein the failure to establish the mobile station-initiated call is masked from the user.

9. A mobile station for improving the user perception of good network coverage of a wireless telecommunications system, the mobile station comprising:
    a user interface, the user interface including means for selecting a destination and means for initiating a mobile station-initiated call to the destination;
    analog transceiver circuitry for communicating air interface signals between the mobile station and a base station;
    a memory having a memory portion for recording indications of occurrences of calls; and
    digital logic circuitry coupled to the user interface, analog transceiver circuitry and memory, the digital logic circuitry comprising processing logic programmed or configured to:
    detect a failure to establish a mobile station-initiated call to a destination;
    record in the memory portion an indication of the destination and a corresponding call failure indication in response to detection of failure to establish the mobile station-initiated call;
    determine whether a call can be communicated through a selected base station; and
    direct the mobile station to re-try establishing the mobile station-initiated call to the destination in response to a determination that a call can be communicated through the selected base station;
    wherein the operations of the processing logic are masked from the user;
    wherein the failure to establish the mobile station-initiated call is masked from the user.

10. The mobile station claimed in claim 9, wherein the processing logic directs the mobile station to seek, in response to detecting failure to establish the call to the destination, a base station through which it is determined that a call can be communicated.

* * * * *